United States Patent [19]
Schmid et al.

[11] Patent Number: 5,252,016
[45] Date of Patent: Oct. 12, 1993

[54] FIXING ELEMENT FOR LOW STRENGTH MATERIALS

[75] Inventors: Paul M. Schmid, Camarillo, Calif.; Richard L. Moore, Boston, Mass.

[73] Assignee: Isolink Inc., Nassau, The Bahamas

[21] Appl. No.: 738,811

[22] Filed: Jul. 31, 1991

Related U.S. Application Data

[63] Continuation-in-part of Ser. No. 515,404, Apr. 27, 1990, Pat. No. 5,059,077.

[51] Int. Cl.$^5$ .................. F16B 25/00; F16B 35/04
[52] U.S. Cl. ............................ 411/386; 411/411; 411/426; 411/908
[58] Field of Search .............. 411/386, 387, 399, 424, 411/426, 908, 411, 307, 308

[56] References Cited

U.S. PATENT DOCUMENTS

| | | |
|---|---|---|
| 350,209 | 10/1886 | Parmelee . |
| 354,123 | 12/1886 | Flynn . |
| 367,011 | 7/1887 | Rogers ............................ 411/426 |
| 633,909 | 9/1899 | Sanford . |
| 1,250,597 | 12/1917 | Kyle . |
| 1,270,036 | 6/1918 | Leclaire . |
| 1,365,508 | 1/1921 | Kucewicz . |
| 1,491,203 | 4/1924 | Enoch . |
| 2,086,928 | 7/1937 | Tiryakian . |
| 3,126,185 | 3/1964 | Christman . |
| 3,208,328 | 9/1965 | Myers ............................ 411/386 |
| 3,224,721 | 12/1965 | Malmquist . |
| 3,421,187 | 1/1969 | Ryder . |
| 4,756,653 | 7/1988 | Berger . |
| 4,776,737 | 10/1988 | Wollar ............................ 411/908 |

FOREIGN PATENT DOCUMENTS

| | | |
|---|---|---|
| 0205994 | 5/1986 | European Pat. Off. . |
| 2279010 | 2/1976 | France . |

*Primary Examiner*—Neill R. Wilson
*Attorney, Agent, or Firm*—Wenderoth, Lind & Ponack

[57] ABSTRACT

A fixing element for connecting materials of relatively low strength includes a unitary, one-piece plastic body. An external thread is formed on the plastic body for compressing and compacting the low strength material in the thread turns of the external thread. A first external thread portion has a taper at one end of the plastic body. A second portion has a taper at another end of the plastic body, while a third portion has no taper and extends between the first and second external portions. A penetration tip is connected to the smaller diameter end of the first external thread portion. Further, a stop collar is provided at the large diameter end of the second external thread portion. The penetration tip preferably is a self tapping screw made of a harder material than the plastic body. Further, the thread depth of the second external thread portion decreases along the second external portion as the second external portion approaches the larger diameter of the screw.

20 Claims, 6 Drawing Sheets

FIXING ELEMENT FOR LOW STRENGTH MATERIALS

This is a continuation-in-part of U.S. Pat. No. 5,059,077, Ser. No. 07/515,404, filed Apr. 27, 1990, now U.S. Pat. No. 5,059,077.

BACKGROUND OF THE INVENTION

1. Field of the Invention

The invention relates to an element for fixing construction elements on wall and roof coverings, made of materials of low inherent strength, in particular insulation coverings, e.g. rigid foamed plastic, and more particularly to a fixing element having a basic body made of plastic bearing an external thread.

2. State of the Prior Art

In rooms which have wall coverings made of materials of low inherent strength, e.g. cooling rooms or the like which have inside coverings made of insulation material, the problem arises that, after installing the wall covering, objects have to be mounted on a wall or on the ceiling of the room, such as for example switching and control equipment, lighting fixtures or, for example, even panels, for example made of aluminum or plastic, for the panelling of the wall covering. Since the material used for the wall covering, e.g. rigid foamed polyurethane, has a low inherent strength, and thus known elements for fixing construction elements cannot grip firmly, each construction element to be mounted in a room with covered walls has to be mounted using relatively complex substructures, e.g. using L-bars, which are passed through the insulation layer and connected to the masonry of the room. However, the wall covering is then pierced by substructures of this type. By this means, in the case of the wall covering being, for example, an insulation covering, undesired hot and cold thermal bridges occur; in particular in cooling or refrigeration rooms, a water vapor block is applied under the insulation covering. Due to the substructures necessary for fixing construction elements which pierce the wall covering, this water vapor block is impaired in its function at places where elements for fixing are passed through the insulation covering.

It is true that an element constructed as a plug with an external thread is known according to DE-A-2,256,938. However, this serves for fixing heavy objects on walls made of, for example, plaster which, compared with insulation coverings, still have higher loading capacity. The known element constructed as a plug can be screwed with a positive fit into a borehole provided for this purpose, its external thread constructed as a self-cutting thread being intended to be screwed into the borehole into the material of the wall with removal of wall material. The known element is not suitable for anchorage in wall coverings made of relatively soft insulation material, e.g. rigid foamed polyurethane. It always requires a prefabricated borehole, by which the strength of the structure of the wall material is weakened from the very start. Moreover, a borehole has the disadvantageous effect of reducing the insulation function of a wall covering. Since the self-cutting thread of the known element also removes wall material in the surroundings of the borehole while it is being screwed into the borehole, a further weakening of the material structure also takes place which makes the known elements unsuitable for the applications described above. Moreover, the known element harbors the disadvantage that is can only be screwed into the assigned borehole using special tools.

SUMMARY OF THE INVENTION

The underlying object of the invention is to provide an element of the type mentioned above which allows fixing of a construction element on a wall or roof covering, serving in particular for insulation, made of a material with no inherent strength without the insulation function of the wall covering being rendered ineffective in some places and without the necessity of prior mounting of a borehole.

A fixing element according to the invention can be introduced into the material in a simple manner and has an outwardly projecting profile due to its external thread, with the aid of which it can be anchored so firmly in the material that the construction element to be mounted can be fixed on it using conventional fixing means and, in this manner, receives a secure grip.

The fixing element according to the invention can advantageously be screwed into the insulation covering, the insulation material being compressed and compacted in the thread turns and thus offering the fixing element an adequate grip. The greater the thread depth is and the more thread turns the plug has within the insulation, the more secure is its grip in the wall covering. The fixing element can advantageously be screwed so far into the wall until it has sufficient grip but the wall covering is not completely pierced such that it retains its effectiveness, in particular its insulation property. Since the wall covering is interlocked with the fixing element in the thread turns of the external thread, any possible function of the wall covering as a water vapor block is, advantageously, not impaired by the fixing element. The construction element to be mounted can be mounted on the freely accessible end face of the fixing element introduced into the wall covering with the aid of the conventional fixing means, e.g. screws.

Since the element according to the invention has the shape of a pointed cone, it can penetrate like a screw into the wall covering without greater resistance.

The pitch of the element according to the invention constructed as a pointed cone is preferably constant over the entire length of the external thread.

The external thread of the element according to the invention is preferably a pointed thread because, due to its increased friction fit, the pointed thread is particularly suited for elements of the type concerned here.

Means for detachable mounting of objects are mounted on the holding head.

The head present at the front side and constructed as a wrench fitting has the advantage that a commercial manual tool, preferably a wrench, in particular a socket wrench, can be applied so that the element according to the invention can be screwed easily and securely into the wall covering and, if desired, can be unscrewed again.

The element according to the invention is preferably moulded out of plastic. The element according to the invention also lends itself to being made of other suitable materials. The element moulded out of plastic is itself advantageously a thermal insulator so that any desired insulation properties of the wall covering are hardly changed at the location of the fixing element.

Furthermore, the plastic preferably used as a material for the element according to the invention is temperature-resistant and impact-resistant.

In preferred developments of the element according to the invention, the pitch of the external thread is 7 to 11 mm, preferably 9 mm, and the thread depth is 6 to 9 mm, preferably 7.5 mm. The resulting thread depth is thus relatively deep. An external thread which has the preferred dimensions in these tolerance ranges has been experienced to give the element according to the invention a secure grip, in particular in wall coverings made of rigid foamed plastic.

BRIEF DESCRIPTION OF THE DRAWINGS

Exemplary embodiments are illustrated in the drawings, in which.

DETAILED DESCRIPTION OF THE PREFERRED EMBODIMENTS

Figure 1:
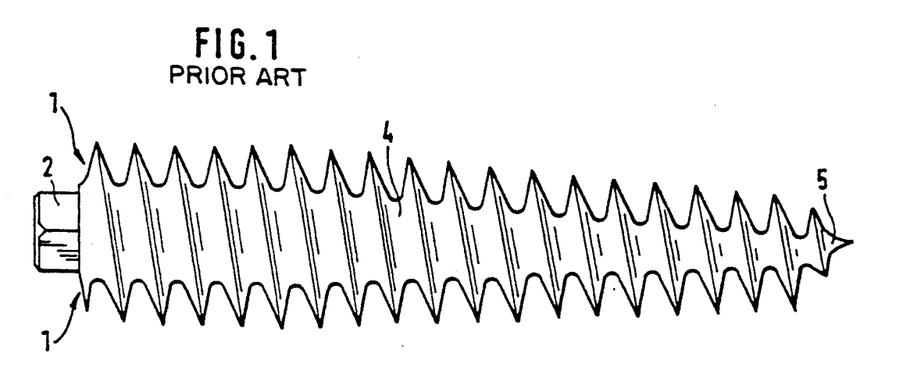
FIG. 1 shows a lateral view of a prior art device.

FIG. 1 illustrates a side view of a fixing element according to the prior art. The fixing element has an external thread 1 constructed as a pointed thread and is constructed in the shape of a pointed cone. The pitch of the external thread 1 is constant over the length of the fixing element such that the angle of the lead of the external thread 1 increases towards the point of the pointed cone.

At its front face, the fixing element has a hexagonally constructed head 2 as a wrench fitting to which a wrench can be applied.

Figure 2:
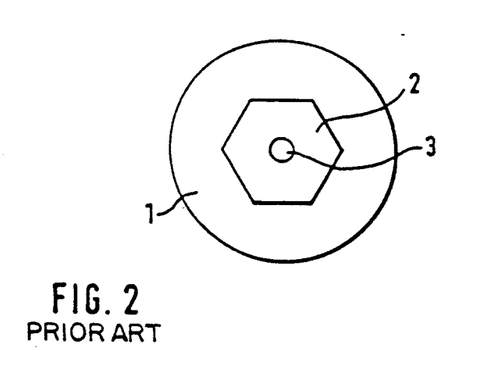
FIG. 2 shows a front view of the device according to FIG. 1.

It can be seen in FIG. 2, in which the same construction elements are given the same reference numerals as in FIG. 1, that the fixing element has an inside borehole 3 starting in the head 2 and extending along its longitudinal mid-axis, into which inside borehole a fixing means, e.g. a screw, can be introduced.

All the embodiments of the present invention illustrated in FIGS. 3-8 have the common factor that they are manufactured from a dimensionally stable plastic and have a pointed conical threaded body 4 which extends into a sharp point 5. In a preferred exemplary embodiment, the cone angle of the point 5 is between 5° and 15° and has the task of centering the device when it is first placed on, and of facilitating its initial penetration into, the material of the wall covering.

Figures 3, 4, 5:
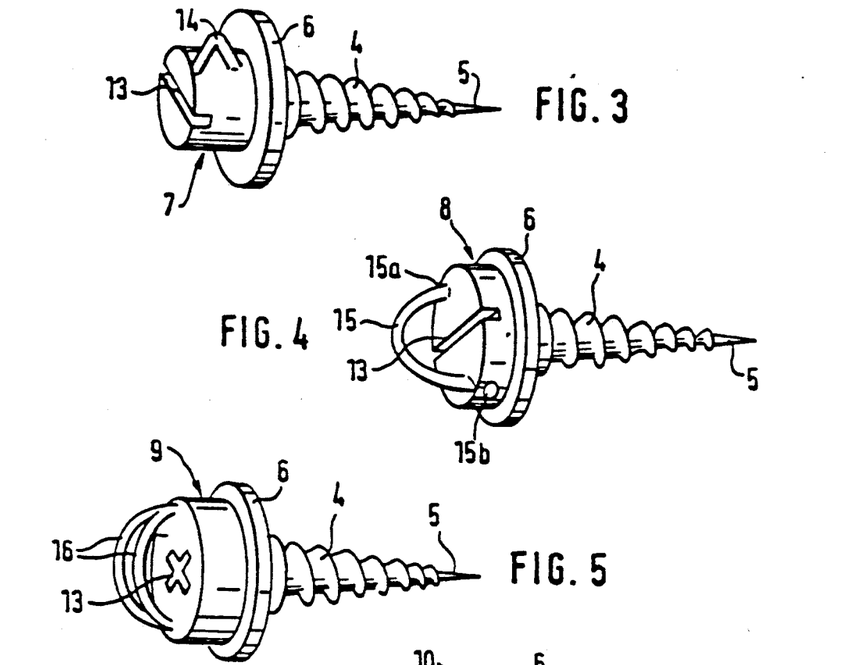
FIGS. 3 to 8 illustrate variations of a first embodiment according to the present invention.

Adjoining the threaded body 4 on the section opposite the point 5 is a stop collar 6 (FIG. 3), which is preferably of circular cylindrical construction, and which has the task of precisely limiting the penetration depth of the fixing element when the fixing element is screwed in. Moreover, the stop collar 6 serves as a base for a holding head 7 (FIG. 3) which, in turn, fulfills two main functions. The holding head 7, preferably of circular cylindrical construction, which is given the reference numerals 7 to 12 in FIGS. 3 to 8, serves as the bearer of a slot 13 which permits the application of a screwdriver so that the plug can be screwed in with relatively great force. However, the fixing element, in particular above a certain size, can be screwed very easily by hand into any material of low strength while still being anchored securely in the material. The slot 13 can either be constructed as a simple linear slot according to FIGS. 3, 4, 6 and 8 or, as shown in FIGS. 5 and 7, as a recessed cross for a Phillips head screwdriver, the latter design being given preference.

According to the second function of the holding head 7 to 12, any holding or hanging arrangement can be provided on the head projecting out of the wall, the holding or hanging arrangement serving for the detachable, provisional or permanent reception of varied objects. Thus, in an uncomplicated manner and at any point, an additional holding arrangement can be provided which serves for mounting objects of use, such as tools, etc., in living rooms, kitchens, bathrooms, or even in workshops, production halls, etc. This device can even be used for the permanent fixing of wall mirrors, paintings etc.

The fixing organ moulded onto the holding heads 7 to 12 can then have a varied shape depending on the application. According to FIG. 3, this is a simple hook 14 on which towels, kitchen utensils or small tools, for example, can be hung. According to FIG. 4, the fixing organ is a shackle 15 which is firmly anchored on one side at a point 15a on the holding head 8, but, with the other free end bearing a catch knob, it can be plugged into a recess 15b in the shape, for example, of a keyhole and can be secured by this means on the holding head 8. The fixing organ denoted as 16 in FIG. 5 is a double shackle which exposes the front for access to the recessed cross 13.

Figure 6:
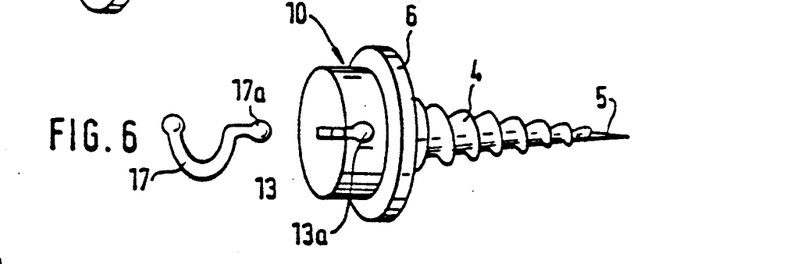
Figures 7, 8:
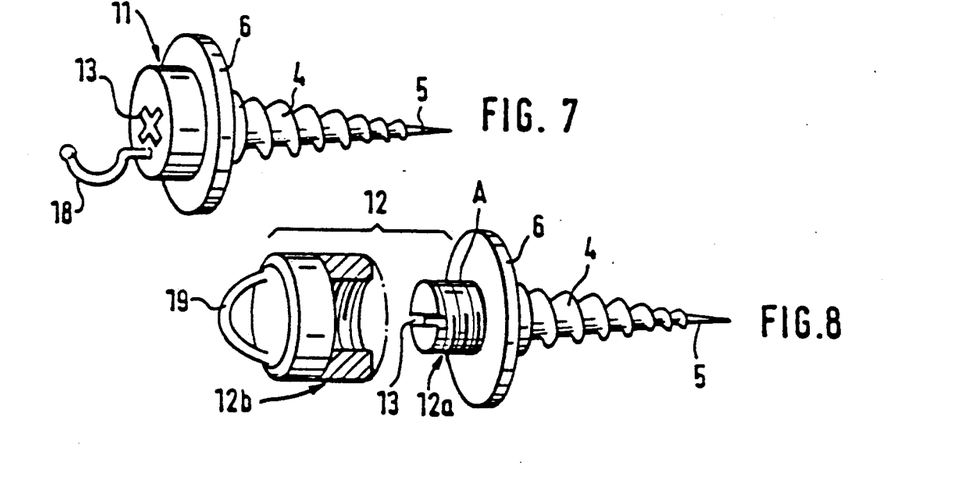

According to FIG. 6, a groove 13 is moulded into the holding head 10, which groove is extended at the groove base to form a cylindrical channel 13a. In this manner, a hook 17 provided with a knob-like thickening 17a can be pushed into the groove 13 up to the lateral stop, in which case the groove 13 can, if required, still serve for screwing in the fixing element by means of a screwdriver. FIG. 7 shows a hook 18 moulded onto the holding head 11. According to FIG. 8, the holding head 12 is constructed in two parts: an inner part 12a provided with an external thread A and a slot 13 moulded onto the collar 6. A second part 12b is constructed as a crown nut with an internal thread and can be screwed onto the inner part 12a, can be removed, if required, without problems and, if appropriate, can be replaced by another crown nut. While the part 12b has a closed shackle 19, the most varied holding arrangements can be stored and, if required, screwed onto the inner part 12a.

Of course, the holding head does not have to be constructed as a circular cylindrical solid part separate from the fixing organ, but can itself be moulded directly onto the collar 6 in the shape of a hook, shackle etc., in which case the slot required for operation by means of a screwdriver would then have to be mounted in the central region of the collar 6.

Figure 9:
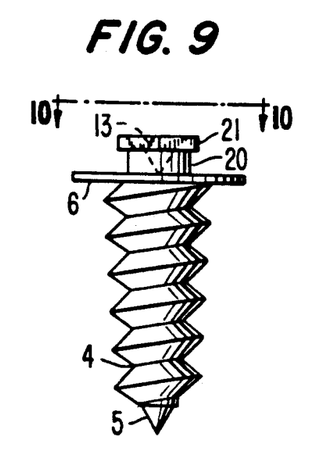
FIG. 9 is a side view of a second embodiment of the present invention.

FIG. 9 illustrates a further embodiment of the present invention. In this arrangement, a holding head 20 extends outwardly of the stop collar 6 and has a cap or flange arrangement 21 thereon. This cap or flange arrangement 21 thus forms, with the stop collar 6, a cylindrical neck therebetween in the form of the holding head 20. The holding head 20 thus provides a surface for the disposition of a hanger or other holding arrangement on the fixing element after the fixing element has been threaded into its support material. The cap or flange 21 prevents such a hanger from sliding off of the neck.

Figure 10:
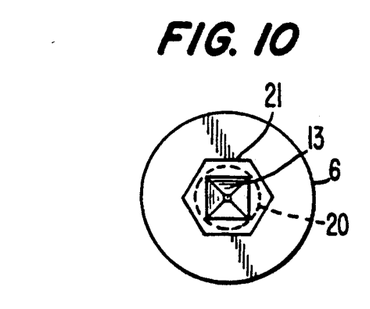
FIG. 10 is an end view of the second embodiment along line 10—10 of FIG. 9.

The cap or flange 21 can further provide an arrangement on the holding head 20 for threading the fixing element into its support material. Noting FIG. 10, the cap or flange 21 is illustrated as a hexagon, which can be engaged by a wrench, for example a socket wrench. In addition, a recess 13 is provided, similar to the recesses illustrated in FIGS. 3–8, for the insertion of a wrench or tool for threading the fixing element. This recess can take a form appropriate for the insertion of Phillips head screwdriver, as illustrated in FIG. 10, or can of course be a straight slot for a flat head screwdriver, a hexagonal recess for an Allen wrench, etc.

The cap 6, when the fixing element is in use with a hanger placed on the neck area of the holding head 20, supports the hanger against the material into which the fixing element has penetrated. That is, the cap 6 extends outwardly of the cross sectional area penetrated by the threads 4 and provides a wide support area for distributing the weight supported by the hanger on the material penetrated by the fixing element. The unique taper of the screw, further, imparts a tremendous pull-out resistance to the fixing element, resisting any tendency for the weight supported by a hanger to pull the fixing element out of the material into which the fixing element has penetrated.

Figure 11:
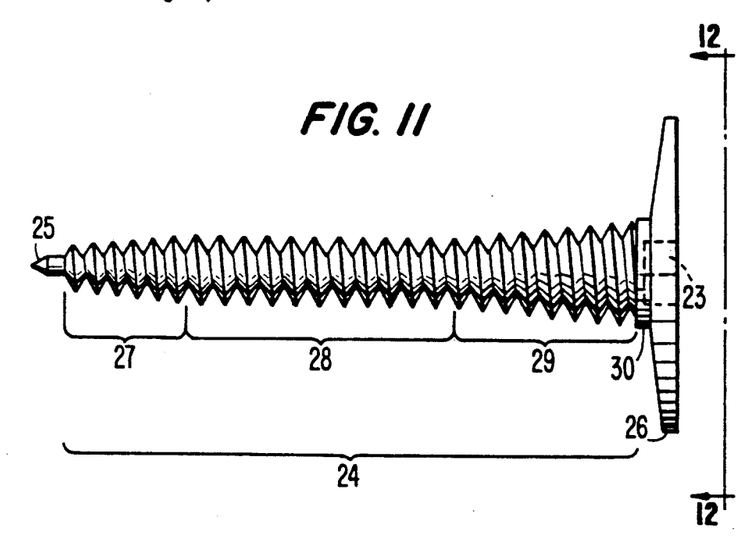
FIG. 11 is a side view of a third embodiment according to the present invention.
Figure 12:
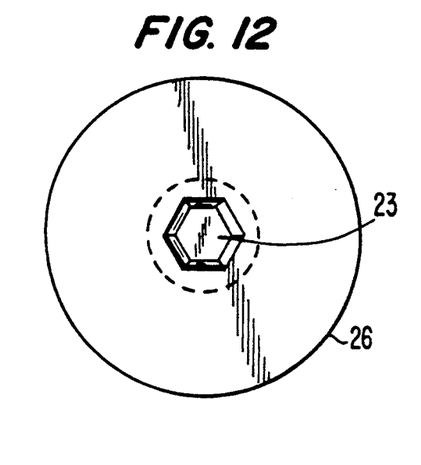
FIG. 12 is an end view of the third embodiment along line 12—12 of FIG. 11.

FIGS. 11 and 12 illustrate a third embodiment of the present invention, wherein the fixing element is particularly adapted for securing roof membranes. The significant difference in use with respect to the third embodiment here illustrated, is that instead of securing an item to be hung, for example, to a low strength insulation material, the purpose of the fixing element in FIGS. 11 and 12 is to secure layers of low strength materials together. While the above-described embodiments are, to some degree, useful for this purpose, the present embodiment illustrated in FIGS. 11 and 12 has been particularly adapted to the securing of roof membranes together in forming roof insulation.

In FIG. 11, the fixing element illustrated has a threaded section 24, with threads similar to those described with respect to the above embodiments, except for the following variations. Four separate areas 25, 27, 28 and 29 are provided. Areas 27 and 29 are both tapered portions tapered in a similar manner to the fixing element of the above-described embodiments. However, section 28 is a straight threaded section which has no taper. This straight screw section is used for the penetration of a substrate. The sections 27 and 29, similar to the above embodiments, are used for providing holding strength, giving tremendous pull-out resistance as a result of the unique taper of the screw. Thus sections 27 and 29 might both engage separate insulation membranes where a good holding strength is required, whereas the straight section 28 serves to extend through an intermediate layer.

Similar to the above-described embodiments, a sharp point 25 is provided for facilitating the initial penetration of the fixing element into a high density material to be connected to the insulation of low density. The sharp point 25 is conical, but has a cylindrical section in this case, connecting the conical portion to the threaded portion 24. The point 25 may be unitary with the remainder of the fixing element as described with the above embodiments, but alternatively, and in some cases preferably with the third embodiment, can take the form of a self tapping metal screw. That is, instead of having an unthreaded conical tip, the point is formed essentially as a self tapping screw for initial penetration into higher density materials such as steel and wood. In assembling roof membranes, there is frequently a bottom layer made of a thin sheet of steel or the like to which a layer of insulation and a thin upper membrane is to be connected. The point 25 forming the self tapping screw is useful in easily punching through and connecting to the steel. A stop collar 26 is similarly provided with this embodiment. In the case of attaching roof membranes and forming roof insulation, the stop collar 26, or cap, serves to support the upper membrane or insulation layer against wind uplift on the roof. Furthermore, the cap also tends to seal against water penetration through the roof insulation membranes by covering and sealing the area around the hole formed by the penetration of the threads 24.

FIG. 11 further illustrates the cap portion 26 as having a slight inward taper, extending to a cylindrical region 30 between the threaded portion 24 and the cap 26. Cylindrical region 30 adjacent the cap portion 26 has the purpose of ensuring a close and tight engagement of a membrane against an underlying soft insulating material. In other words, after the fastener has been connected to the insulating material, the membrane is tightly pressed by the cylindrical region 30 against the insulating material. The cap 26 also has a recess 23 therein for the insertion of a proper tool for inserting the fixing element into the roof membranes. This recess, similar to the above embodiments, may be of any shape for an appropriate tool, but is in this case preferably, as illustrated, a hexagonal recess for a hexagonal tool of a driving drill.

An example of the fixing element of the embodiment of FIGS. 11 and 12 has a 30° conical taper for the sharp point 25, and a length of 0.135 inches for the cylindrical section connected thereto. The section 27 has a 12° taper and a length of 1.125 inches, section 28 having a length of 2.125 inches with no taper, and section 29 having a length of 1.175 inches with a 5° taper. The angles of the threads is preferably 60°. The cap 26 has a corresponding diameter of 2¼ inches, with a recess adapted for a ⅜ inch hexagonal tool. The thread depth is 1.186 inches, with four threads per inch of length of the screw.

As can be seen from the above, the sections 27 and 29 can have different have taper angles. Having different taper angles permits the adaptation of the taper angle, and thus the required force for driving the fastener into a material, to the type of material. For example, section 27 might have to be driven into a wooden panel, whereas the other sections, sections 28 and 29, might only have to enter a soft insulating material. The third embodiment allows the fastening of a thin, waterproof membrane upon a relatively thick layer of thermally insulating material as especially required on roofs. When fastening such a membrane, usually a plastic sheet, on the insulating layer, for example expandable polystyrene, the tip 25 will first penetrate into the material. As soon as the first windings of the thread portion 27 have penetrated into the soft material, no axial pressure will have to be exerted on the screw, because from that point the mere rotation will force the fastener into the workpiece. As the portion 27 is tapered, it progressively displaces and compacts the surrounding soft material. As soon as the section 28 enters the material, the amount of effort required for turning the fastener is considerably reduced, because no more compaction is possible and the cylindrical section 28 merely enters the preformed bore. When the cylindrical section 28 has completely entered the material, then section 29 enters and achieves a final compacting action to ensure a close and sure grip when pressing the membrane against the soft insulating material. The central cylindrical thread portion facilitates the penetration of the fastener, especially into insulating layers of substantial thickness, by reducing the required torque during a certain period of the turning operation.

Figure 13:
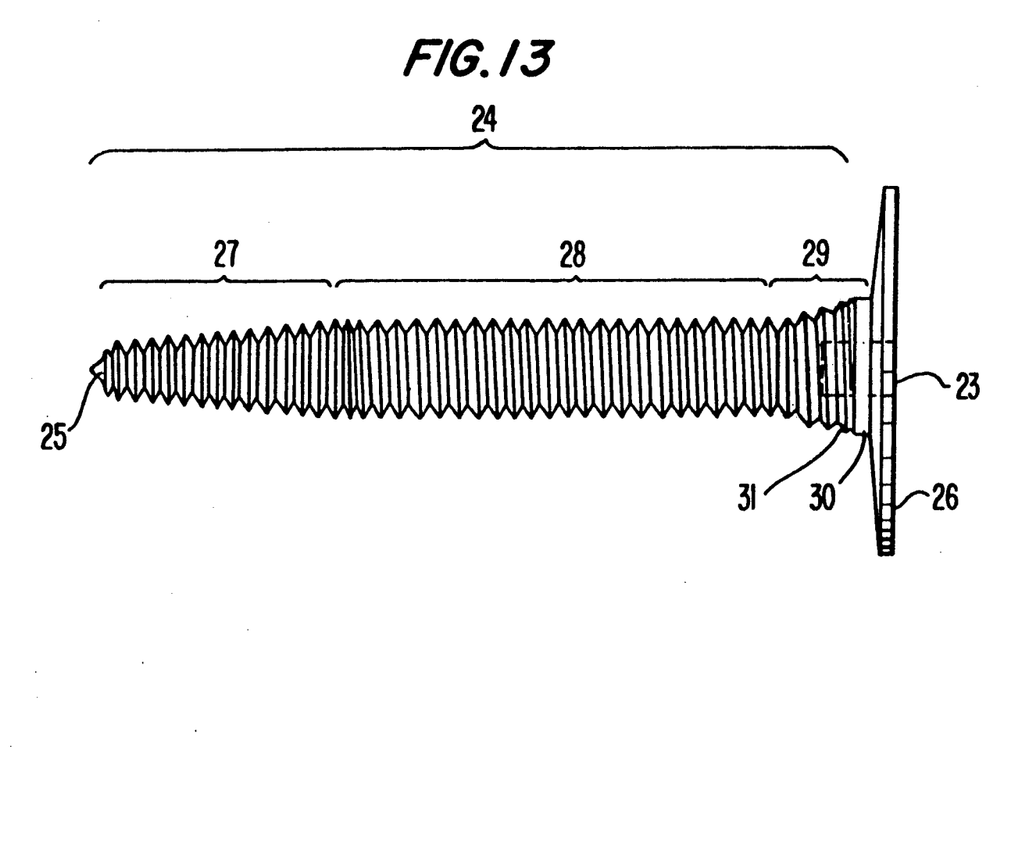
FIG. 13 is a side view of a modification according to the third embodiment.

FIG. 13 illustrates a variation of the third embodiment according to the present invention. As has been discussed above, the threads along the three sections 27, 28 and 29 of the fixing element are relatively deep in order to properly fix and hold a low density material. But when fastening a water proof membrane upon a relatively thick layer of thermally insulating material as discussed above with respect to forming roof insulation, the membrane, usually a plastic sheet as discussed above, will encircle the cylindrical region 30. In order to ease the thin membrane from the relatively deep threads of the fixing element onto the cylindrical region 30, along a portion of the section 29 the thread depth of the relatively deep threads becomes progressively shallower toward the cylindrical region 30. In other words, the bottom of the threads begins to taper outwardly at a greater rate than the taper of the thread section 29 so that the threads become progressively shallower until they disappear altogether, the bottom of the thread merging with the cylindrical section 30. This thread bottom is illustrated by element No. 31 in FIG. 13. Thus a smooth transition of the thin membrane at the end of the attachment of the fixing element occurs, the thin membrane being gradually expanded outwards to the diameter of the cylindrical region 30. This helps to ensure that the connection is water proof, by preventing thread damage to the thin membrane.

Figure 14:
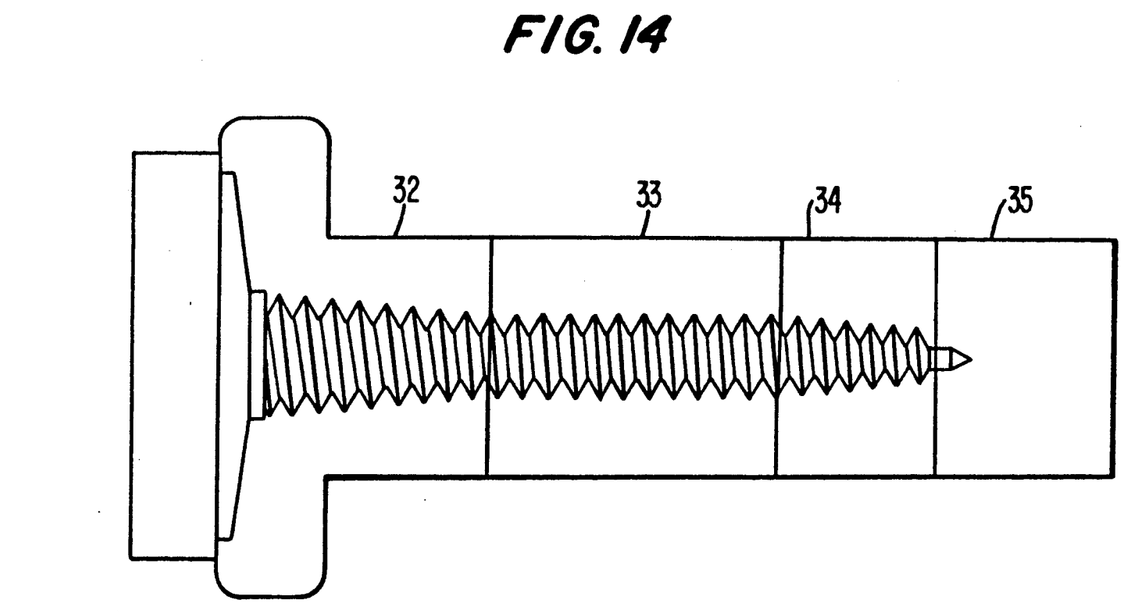
FIG. 14 is a schematic view of a mold-half for making the present invention according to the third embodiment.

With reference to FIG. 14, the fastener according to the third embodiment of the present invention can be made through the use of four separate mold sections 32, 33, 34 and 35. The top portion of the fastener is molded by the mold section 32. The lower section is molded with a mold section 34. Section 35 is used for forming the sharp point 25.

Figure 15:
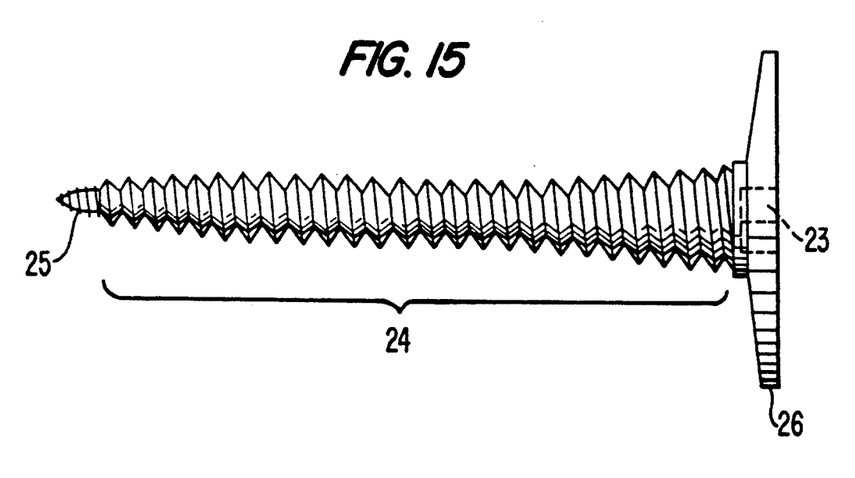
FIG. 15 is a side view of the third embodiment provided with a self-tapping screw.

The sharp point 25, as has been discussed above, can take several forms. It can merely be made of plastic and be unitary with the remainder with the fixing element in the form of an unthreaded conical tip. It can also be a penetrating tip of a harder material, for example steel. As was discussed above, the penetrating tip could be a self tapping screw, as for example illustrated in FIG. 15. If provided as a separate penetrating tip or self tapping screw, the self tapping screw or the penetrating tip can be inserted into the mold section 35 before assembling the mold pieces. The mold section 35 will then hold the separate element for proper molding of the fixing element therewith. Typically, a separate penetrating tip of a harder material such as steel will have some form of shaft that will extend into the body of the fixing element to hold it therein. In the case of the self tapping screw, since the self tapping screw is typically used to penetrate and thread into a thin steel sheet, the rotation of the self tapping screw relative to the remainder of the fixing element must be prevented. Accordingly, the shaft of this screw is provided with some suitable means for gripping the material of the fixing element molded around it, for example teeth on the shaft of the self tapping screw rotationally gripping the material of the fixing element.

The middle section of the mold 33 has no taper, and is provided as a physically separate section. Thus this section can be replaced by any similar screw mold section of any desired length. This also allows the manufacture of a screw of any desired length by changing the length of the middle, untapered section. This allows the manufacture of a screw of any desired length without compromising the holding power of the tapered sections.

Although the present invention has been described and illustrated with respect to preferred features thereof, it is to be understood that various modifications and changes may be made to the specifically described and illustrated features without departing from the scope of the present invention.

We claim:

1. A fixing element for connecting to materials of relatively low strength, comprising a unitary, one piece plastic body having:

an external thread means formed on said one-piece plastic body for compressing and compacting a low strength material in the thread turns of said external thread means as said unitary one piece plastic body is threaded into the low strength material, said external thread means comprising deep, in comparison with the pitch thereof, external threads having a larger diameter end and a smaller diameter end;

an unthreaded conical tip unitary with said external threads at said smaller diameter end thereof for penetration of said unitary one piece plastic body into the low strength material, said external threads and said unthreaded conical tip having a common axis;

a stop collar unitary with said external threads at said larger diameter end thereof, said stop collar having a larger diameter than said larger diameter end of said external threads, wherein said unitary one piece plastic body has a central axis coincident with said common axis, said stop collar having a first surface facing said external threads and said unthreaded conical tip for engagement with the low strength material and a second surface facing away from said external threads and said unthreaded conical tip; and turning means for turning said unitary one piece body to cause said external thread means to be engaged with the low strength material, said turning means being disposed substantially centrally of said stop collar and substantially symmetrically with respect to said central axis;

wherein said deep external threads comprise a first tapered portion adjacent said stop collar and a second tapered portion adjacent said unthreaded conical tip, and wherein said external thread means further comprises a deep external threads portion having no taper between said first and second tapered portions, whereby said first and second tapered portions can provide holding strength and pull-out resistance and said thread portion having no taper can provide straight substrate penetration.

2. The fixing element of claim 1, wherein said second surface of said stop collar is substantially planar and said turning means comprises a centrally disposed recess in said second surface.

3. The fixing element of claim 1, and further comprising a cylindrical portion between said stop collar and said first tapered portion of said deep external threads.

4. The fixing element of claim 1, wherein said unthreaded conical tip has a cylindrical section between said second tapered section of said deep external threads and itself.

5. The fixing element of claim 1, wherein said first and second tapered portions and said unthreaded conical tip have a cone angle of 5° to 15°.

6. The fixing element of claim 5, wherein said first tapered portion has a cone angle of 5° to 12°.

7. The fixing element of claim 1, wherein said external threads have a constant pitch.

8. The fixing element of claim 7, wherein said constant pitch is between 7 and 11 mm.

9. The fixing element of claim 8, wherein said constant pitch is 9 mm.

10. The fixing element of claim 8, wherein the depth of said external threads is 6 to 9 mm.

11. The fixing element of claim 10, wherein the depth of said external threads is 7.5 mm.

12. A fixing element, comprising:
a plastic body;
an external thread means formed on said plastic body for compressing and compacting a low strength material in the thread turns of said external thread means as said plastic body is threaded into the low strength material, said external thread means comprising a first external thread portion having a taper at one end of said plastic body, a second external thread portion having a taper at another end of said plastic body and a third external thread portion having no taper between said first and second external thread portions;
a penetration tip connected to a smaller diameter end of said first external thread portion;
a stop collar at a larger diameter end of said second external thread portion; and
a turning means for turning said plastic body for engaging said external thread means with the material to which it is to be connected, said turning means being disposed at said stop collar;
wherein the thread depth of said second external thread portion decreases along said second external thread portion as said second external thread portion approaches said larger diameter end thereof.

13. The fixing element of claim 12, wherein:
said penetration tip and said stop collar are unitary and in one piece with said plastic body.

14. The fixing element of claim 12, wherein:
said stop collar is unitary and one piece with said plastic body; and
said penetration tip comprises a harder material than said plastic body for penetration into hard materials.

15. The fixing element of claim 12, and further comprising a cylindrical portion between said stop collar and said second external thread portion.

16. The fixing element of claim 15, wherein said cylindrical portion has a diameter substantially equal to the diameter of the threads of said second external thread portion at their widest point, said second external thread portion tapering from said cylindrical portion toward said third external thread portion.

17. The fixing element of claim 12, wherein said penetration tip comprises a self tapping screw made of a harder material than said plastic body for penetration into high density materials.

18. A fixing element, comprising:
a plastic body;
an external thread means formed on said plastic body for compressing and compacting a low strength material in the thread turns of said external thread means as said plastic body is threaded into the low strength material, said external thread means comprising a first external thread portion having a taper at one end of said plastic body, a second external thread portion having a taper at another end of said plastic body and a third external thread portion having no taper between said first and second external thread portions;
a penetration tip connected to a smaller diameter end of said first external thread portion;
a stop collar at a larger diameter end of said second external thread portion; and
a turning means for turning said plastic body for engaging said external thread means with the material to which it is to be connected, said turning means being disposed at said stop collar;
wherein said penetration tip comprises a self tapping screw made of a harder material than said plastic body for penetration into high density materials.

19. The fixing element of claim 18, and further comprising a cylindrical portion between said stop collar and said second external thread portion.

20. The fixing element of claim 19, wherein:
cylindrical portion has a diameter substantially equal to the diameter of the threads of said second external thread portion at their widest point, said second external thread portion tapering from said cylindrical portion toward said third external thread portion; and
the thread depth of said second external thread portion decreases along said second external thread portion approaching said cylindrical portion.

* * * * *